United States Patent
Desportes et al.

(10) Patent No.: US 11,604,765 B2
(45) Date of Patent: *Mar. 14, 2023

(54) DATABASE AND FILE STRUCTURE CONFIGURATIONS FOR MANAGING TEXT STRINGS TO BE PROVIDED BY A GRAPHICAL USER INTERFACE

(71) Applicant: salesforce.com, inc., San Francisco, CA (US)

(72) Inventors: Anthony Desportes, San Francisco, CA (US); Catherine Jane de Heer, Oakland, CA (US)

(73) Assignee: salesforce.com, inc., San Francisco, CA (US)

(*) Notice: Subject to any disclaimer, the term of this patent is extended or adjusted under 35 U.S.C. 154(b) by 316 days.

This patent is subject to a terminal disclaimer.

(21) Appl. No.: 16/526,857

(22) Filed: Jul. 30, 2019

(65) Prior Publication Data

US 2019/0354511 A1 Nov. 21, 2019

Related U.S. Application Data

(63) Continuation of application No. 15/458,591, filed on Mar. 14, 2017, now Pat. No. 10,417,183.

(51) Int. Cl.
G06F 16/00 (2019.01)
G06F 16/16 (2019.01)
G06F 9/451 (2018.01)
G06F 16/25 (2019.01)

(52) U.S. Cl.
CPC ............ *G06F 16/164* (2019.01); *G06F 9/451* (2018.02); *G06F 9/454* (2018.02); *G06F 16/168* (2019.01); *G06F 16/252* (2019.01)

(58) Field of Classification Search
CPC .... G06F 16/164; G06F 16/168; G06F 16/252; G06F 9/454; G06F 9/451
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,652,884 A * | 7/1997 | Palevich ............... G06F 9/454 713/1 |
| 5,715,450 A | 2/1998 | Ambrose et al. |
| 5,761,419 A | 6/1998 | Schwartz et al. |

(Continued)

*Primary Examiner* — Leslie Wong
(74) *Attorney, Agent, or Firm* — LKGlobal | Lorenz & Kopf, LLP

(57) ABSTRACT

A computer-implemented database system as described herein includes a memory device and one or more processors coupled with the memory device. The one or more processors are configurable to create and maintain a folder structure for a user interface (UI) environment, wherein the folder structure includes: a feature folder that defines an application feature supported by the UI environment, the application feature having a UI component associated therewith, and the UI component having a UI text string associated therewith; a component folder located in the feature folder, the component folder having computer readable files that define the UI component; and a text string file located in the component folder, wherein the text string file defines content of the UI text string.

20 Claims, 9 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,128,016 A * | 10/2000 | Coelho ............... H04L 41/0803 707/999.102 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,342,907 B1 * | 1/2002 | Petty ........................ G06F 8/38 715/708 |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,429,882 B1 * | 8/2002 | Abdelnur ............ G06F 16/2428 715/763 |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 * | 5/2004 | Warshavsky ............ G06F 16/86 |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,947,959 B1 * | 9/2005 | Gill ........................ G06Q 10/10 715/202 |
| 6,963,910 B1 * | 11/2005 | Belknap ............ H04N 21/2385 709/229 |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,032,837 B2 * | 10/2011 | Bowman ................. G06F 9/451 715/760 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,392,877 B1 * | 3/2013 | Chiluvuri .................. G06F 8/36 717/106 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,527,943 B1 * | 9/2013 | Chiluvuri .................. G06F 8/36 717/111 |
| 8,566,301 B2 | 10/2013 | Rueben et al. |
| 8,578,329 B1 * | 11/2013 | Chiluvuri .................. G06F 8/36 717/107 |
| 8,646,103 B2 | 2/2014 | Jakobson et al. |
| 9,098,472 B2 * | 8/2015 | Bach ..................... G06F 16/164 |
| 10,417,183 B2 * | 9/2019 | Desportes ............... G06F 9/454 |
| 2001/0044791 A1 | 11/2001 | Richter et al. |
| 2002/0004755 A1 * | 1/2002 | Balthaser ............ G06F 40/166 715/240 |
| 2002/0072951 A1 | 6/2002 | Lee et al. |
| 2002/0082892 A1 | 6/2002 | Raffel |
| 2002/0085020 A1 * | 7/2002 | Carroll, Jr. ................. G06F 8/38 715/700 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0160822 A1 * | 8/2003 | Belz ........................ G06F 9/451 715/762 |
| 2003/0169293 A1 * | 9/2003 | Savage .................. G06F 3/0481 715/762 |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 * | 1/2004 | Rothwein .................. G06F 8/38 715/763 |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0163046 A1 * | 8/2004 | Chu ......................... H04L 67/36 715/251 |
| 2004/0186860 A1 | 9/2004 | Lee et al. |

(56) References Cited

U.S. PATENT DOCUMENTS

| | | | |
|---|---|---|---|
| 2004/0189707 A1* | 9/2004 | Moore | G06F 16/16 715/777 |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0257204 A1* | 11/2005 | Bryant | G06F 9/451 345/473 |
| 2006/0021019 A1 | 1/2006 | Hinton et al. | |
| 2006/0036568 A1* | 2/2006 | Moore | G06F 16/168 |
| 2006/0080336 A1* | 4/2006 | Zhang | G06F 8/36 |
| 2006/0190808 A1* | 8/2006 | Balthaser | C02F 1/004 715/234 |
| 2007/0055936 A1* | 3/2007 | Dhanjal | G06F 9/451 715/700 |
| 2007/0113287 A1* | 5/2007 | Blumenau | G06F 16/168 726/26 |
| 2007/0288644 A1* | 12/2007 | Rojas | G06F 8/38 709/230 |
| 2008/0092057 A1* | 4/2008 | Monson | G06F 9/451 715/744 |
| 2008/0216006 A1* | 9/2008 | Jordan | G06Q 30/04 715/771 |
| 2008/0249972 A1 | 10/2008 | Dillon | |
| 2009/0044144 A1* | 2/2009 | Morris | G06F 3/04842 715/804 |
| 2009/0055760 A1* | 2/2009 | Whatcott | H04L 12/282 715/764 |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2010/0142542 A1* | 6/2010 | Van Wie | H04L 67/38 370/400 |
| 2010/0192167 A1* | 7/2010 | Feies | G06F 40/143 719/331 |
| 2010/0217839 A1* | 8/2010 | Kawabe | G06F 8/20 709/219 |
| 2011/0087749 A1* | 4/2011 | Swink | H04M 1/7243 709/206 |
| 2011/0107244 A1* | 5/2011 | Kinoshita | G06F 9/451 715/763 |
| 2011/0247051 A1 | 10/2011 | Bulumulla et al. | |
| 2012/0042218 A1 | 2/2012 | Cinarkaya et al. | |
| 2012/0110515 A1* | 5/2012 | Abramoff | G06F 16/904 715/854 |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0026086 A1* | 1/2014 | Zuverink | G06F 9/451 715/765 |
| 2014/0282133 A1* | 9/2014 | Engel | G06F 8/38 715/763 |
| 2014/0297516 A1* | 10/2014 | Brown | G06F 9/451 705/39 |
| 2015/0058744 A1* | 2/2015 | Dhingra | G06F 9/451 715/747 |
| 2015/0074562 A1* | 3/2015 | Frieder | G06F 16/22 715/760 |
| 2015/0199367 A1* | 7/2015 | Hammer | G06F 16/1748 707/654 |
| 2015/0277404 A1* | 10/2015 | Maturana | G05B 15/02 700/83 |
| 2017/0286229 A1* | 10/2017 | Cheung | G06F 11/1474 |
| 2018/0046365 A1* | 2/2018 | Schuler | G06F 3/04847 |

* cited by examiner

DATABASE AND FILE STRUCTURE CONFIGURATIONS FOR MANAGING TEXT STRINGS TO BE PROVIDED BY A GRAPHICAL USER INTERFACE

CROSS-REFERENCE TO RELATED APPLICATION

This application is a continuation of U.S. application Ser. No. 15/458,591 filed Mar. 14, 2017, which is incorporated herein by reference in its entirety.

TECHNICAL FIELD

Embodiments relate to techniques for managing content to be displayed on a graphical user interface. More particularly, embodiments relate to techniques for utilizing context to create and coordinate text string content to be displayed on the graphical user interface in conjunction with certain features and components.

BACKGROUND

As part of the content they provide, graphical user interfaces generally include various text strings (i.e., user interface text or "UI text") in connection with different features and functions. For example, various control and navigation elements such as buttons include UI text (e.g., "save," "send," and "cancel"). Other examples of graphical user interface elements that include UI text are links, labels for data fields, error messages, confirmation dialogs, legal notices such as disclaimers and agreements, inline help, walkthroughs, and alternative text (which is text read aloud by screen-reading software used by the blind). A complex software application or suite of applications may include hundreds or thousands (or more) of different text strings utilized with a variety of different features, functions, and/or contexts. Within such a complex system, it can be difficult, burdensome, and time consuming to write and maintain the text strings that appear in the software code that implements the system.

Accordingly, it is desirable to have a methodology that can be used to efficiently and effectively organize the UI text of a software application such as a graphical user interface. In addition, it is desirable to have a methodology that facilitates efficient and effective maintenance—that is, updating, correction, and revision—of UI text contained in a complex software application. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In the following description, numerous specific details are set forth. However, embodiments of the invention may be practiced without these specific details. In other instances, well-known structures and techniques have not been shown in detail in order to avoid obscuring the understanding of this description.

UI text strings are an essential part of the user interface (UI) of most software. Like any other text, such as the content of a book or a billboard, UI text works best if it is edited for qualities such as spelling, grammar, wording, consistency, and accuracy. That said, UI text strings typically are not organized in a way that allows them to be easily managed for those qualities. In accordance with the various embodiments described herein, however, improved systems and architectures can be utilized to overcome the problems caused by a lack of contextual information needed to efficiently write and maintain UI text strings in software. Various embodiments provide solutions by associating the UI text strings with context about the strings' appearance, behavior, purpose, and/or other characteristics in the software interface. More specifically, the solutions presented herein utilize suitably configured database structures, file structures, and/or data storage elements to organize and maintain UI text strings with corresponding contextual information, in a logical and effective manner.

Figure 1:
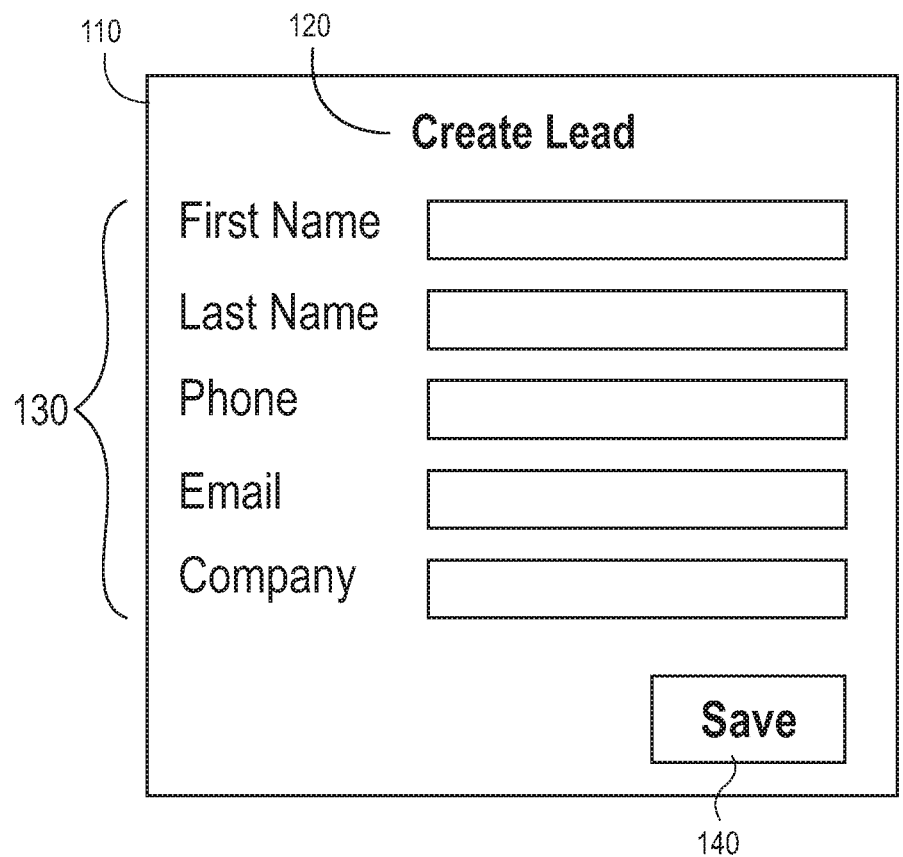
FIG. 1 is an exemplary representation of a UI window that includes several UI components.

In this regard, FIG. 1 depicts an exemplary representation of a UI window 110 that includes several UI components. The UI window 110 may be generated by a software application for display on a display device, in accordance with well-known techniques. FIG. 1 shows merely one simple example of a UI window 110 having a plurality of UI components; other UI windows generated by an application can be much more complex. For this particular example, the UI window 110 corresponds to a "Create Lead" interface in a customer relationship management (CRM) environment; however, UI windows in any type of environment can be managed in a similar manner.

The UI components that appear in association with the UI window 110 include, without limitation: a main label (or title) 120, which can include an appropriate UI text string (e.g., "Create Lead"); a plurality of text entry fields 130; and a button 140. In this example, each of the fields 130 has a respective UI text string: First Name, Last Name, Phone, Email, and Company. Moreover, the button 140 has a UI text string associated therewith: Save. The UI window 110 allows a user to create a record for a new sales lead. She can accomplish this task by interacting with the UI window 110. When she has finished entering the lead's name and contact information, she saves the record by clicking the button 140, which is labeled "Save" in FIG. 1. For this example, the UI window 110 represents one high level feature of the software application, the button 140 represents a UI component of the Create Lead feature, and the word "Save" represents the UI text string content that is associated with the button 140. It should be appreciated that any number of UI text strings and other forms of UI content can be utilized by a software application. In practice, a UI text string can be any word, a combination of words, letters, numbers, or characters, a single character, a phrase, or the like.

Complex software, for example the platforms and services provided by Salesforce.com, Inc., contains tens of thousands of UI text strings across various features. In this regard, a "feature" as used herein refers to a primary module or primary functionality of the software application, such as an email interface, a chat interface, a contacts module, a file uploader, a user profile page, or the like. A feature of an application may include, cooperate with, or be associated with any number of UI components, wherein a "component" represents a self-contained unit of software, for example, a reusable section of a UI. In this regard, a component can range in granularity from a single line of text to an assemblage of elements on a screen. Moreover, a component can include or encompass multiple sub-components if so desired. For example, in a Salesforce-based environment, a component carries information about appearance and behavior that determines the visual and interactive context of the associated UI text (e.g., how a user arrives at the screen, what she sees, and what can happen next). The feature in which the component is used determines the conceptual context of the associated UI text.

As mentioned previously, a software application of the type described here can include any number of features. In turn, each feature may have any number of UI components associated therewith, and each UI component may have one or more UI text strings associated therewith. This hierarchical arrangement can be leveraged for purposes of organizing and maintaining the UI text strings of the application. In this regard, information related to the relationship or association between a UI text string, its corresponding UI component, and its corresponding application feature can be saved and maintained for purposes of managing the text strings of the host software application. In other words, the association of a UI text string with a UI component and an application feature provides much or all of the context needed to ensure that the string accurately and usefully represents an action, instruction, or information in the UI, and to manage it within a repository.

In accordance with some existing software architectures, UI text is maintained in a suitably configured database, folder, or file in a way that allows the application code to reference the maintained UI text. However, the UI text is typically maintained with little to no additional contextual information. For example, in a context-free implementation, the UI text string "Submit" is maintained in a file with an identifier that can be used by the application code as a reference or pointer to that particular instantiation of the word "Submit." In such an implementation, there can be multiple redundant entries for the same UI text string ("Submit"), which need not include the same identifier as the first instance, and which need not be used in the same context with the same application feature and/or with the same UI component. Consequently, a large and complex software application may include an unruly number of redundant, inconsistent, or duplicative UI text strings, which can make it very difficult to change, correct, or update UI text strings.

The problem of organizing UI text strings in traditional software architectures can manifest itself in several ways. For example, suppose that a single UI text string is used in disparate places associated with different functionality. A developer may want to change the string in one feature, but the change could adversely affect other features where the string is also referenced. Referring again to FIG. 1, suppose that the original design of the Create Lead window 100 used the word "Submit" as the label for the button 140. Also assume that a developer decided to change the UI text string "Submit" to "Save" (as it appears in FIG. 1). That change makes good contextual sense for the UI window 110 because clicking on the button 140 initiates an operation to save the new sales lead. Conversely, that change might not make good contextual sense for other instantiations of the UI text string "Submit." For example, assume that the original design of an Email window uses the word "Submit" on a button that is activated to deliver an email message. In that scenario, it would be improper to change the word "Submit" to the word "Save" because the intended functionality of the button is to send the email, not to save the email as a draft. Thus, the UI text for the button in the Email window should either be preserved (as "Submit") or it should be changed to "Send" instead of "Save," which makes better contextual sense for the Email feature. This example shows that referencing the wrong UI text string in a user interface can result in a serious flaw or bug. If the same UI text entry happens to be referenced by two or more different components (having different functionality), then changing that common UI text entry can produce unexpected results with respect to at least one of those components.

Determining which features a UI text string appears in, or which UI components reference it, can be a time-consuming and unreliable process. Even if a developer finds all the references in the code, the code may be structured in such a way that the desired change cannot be made without also making undesired changes to other strings. The methodology presented herein addresses this scenario by providing a reliable and efficient way to determine which components or features reference a UI text string. In other words, the methodology described herein enables the selective updating, changing, or revising of UI text strings in an efficient and effective manner, even if a UI text string to be changed appears in multiple different contexts within the UI environment.

Another potential issue with maintaining UI text in a context-free manner relates to the redundant use of strings. In this regard, suppose that multiple identical UI text strings are repeated many times in similar places across various features. For example, the label "Save" can be used many times in an app (e.g., as a button label). If a separate UI text string is created and centrally stored each time the word "Save" is used in a button, there could be a high level of redundancy within the environment, resulting in inefficiencies and unnecessary complexities. As another example, suppose that a developer wants to change the label "Cancel" to "Stop" throughout an app. The process of finding and changing all the desired UI text entries can be time consuming and produce unreliable results. After a developer has identified the different UI text entries in the appropriate database or folder, he then has to change each string separately. In some situations, there may be no way to change identical strings all at once across an app or a platform, so that each string has to be changed by a different developer. Furthermore, changing even one string—including fixing an error such as a typo—can be a highly manual and expensive process involving multiple people (e.g., a writer, a product manager, a developer, and a quality engineer, and sometimes a localization program manager working with translators).

As another example of a potential issue with maintaining UI text in a context-free manner, suppose that multiple different UI text strings are used to convey the same message. For example, all of the following strings could be used to convey a similar meaning:

1) Error: You can't see this report because you can't view this record
2) You can't view this task because you don't have access to this account
3) Sorry, you can't view this record because you don't have permission
4) Error: You do not have access to this task
5) Error: Insufficient privileges Manually searching a UI text database or repository for different but contextually similar UI text strings is not an effective way to find and correct this kind of inconsistency because the strings may not have enough in common.

For at least the reasons mentioned above, software developers everywhere face the problem of organizing UI text strings. Within a multi-tenant environment (e.g., the Salesforce environment), the problem affects performance, usability, customer support costs, localization, and productivity. These effects span features (e.g., Salesforce clouds) and disciplines across platforms (e.g., at Salesforce, user interfaces for desktop and mobile devices).

Figure 2:
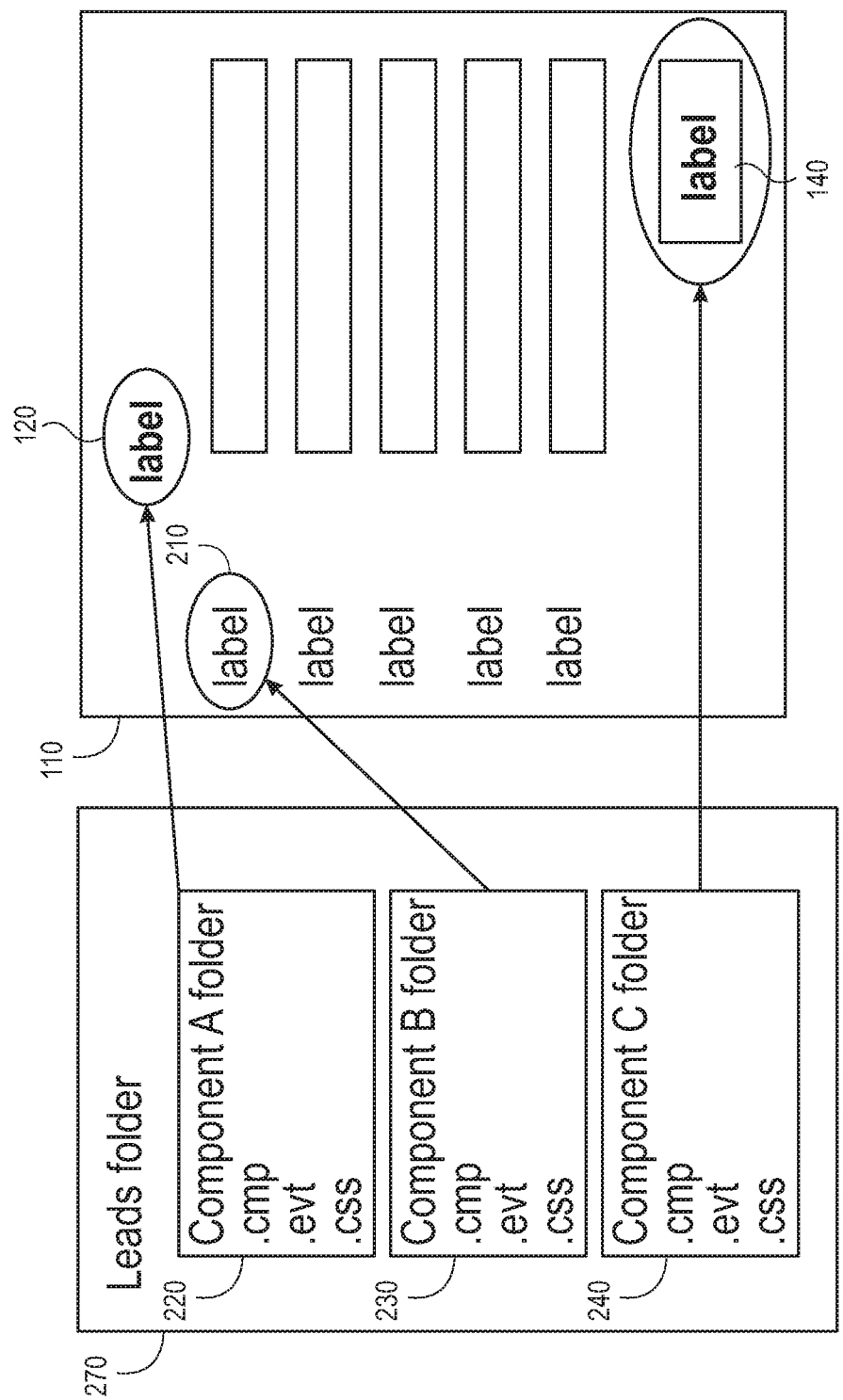
FIG. 2 is a diagram that illustrates how code for UI components can reference labels in the absence of an organizational principle that manages text strings.
Figure 3:
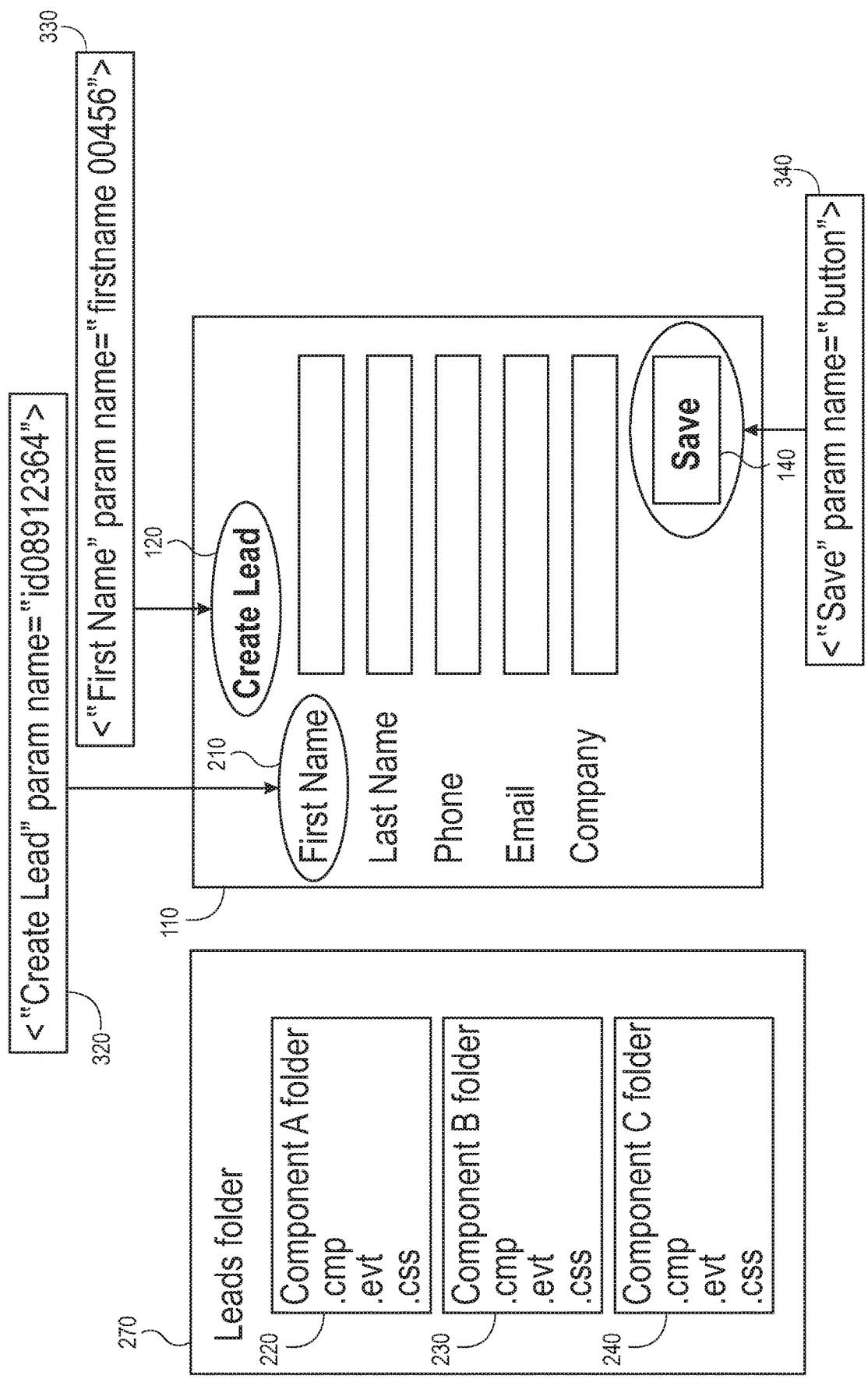
FIG. 3 is a diagram that illustrates a methodology that utilizes UI text strings stored in a location (or different locations) that is referenced by the code of the corresponding UI components.
Figure 4:
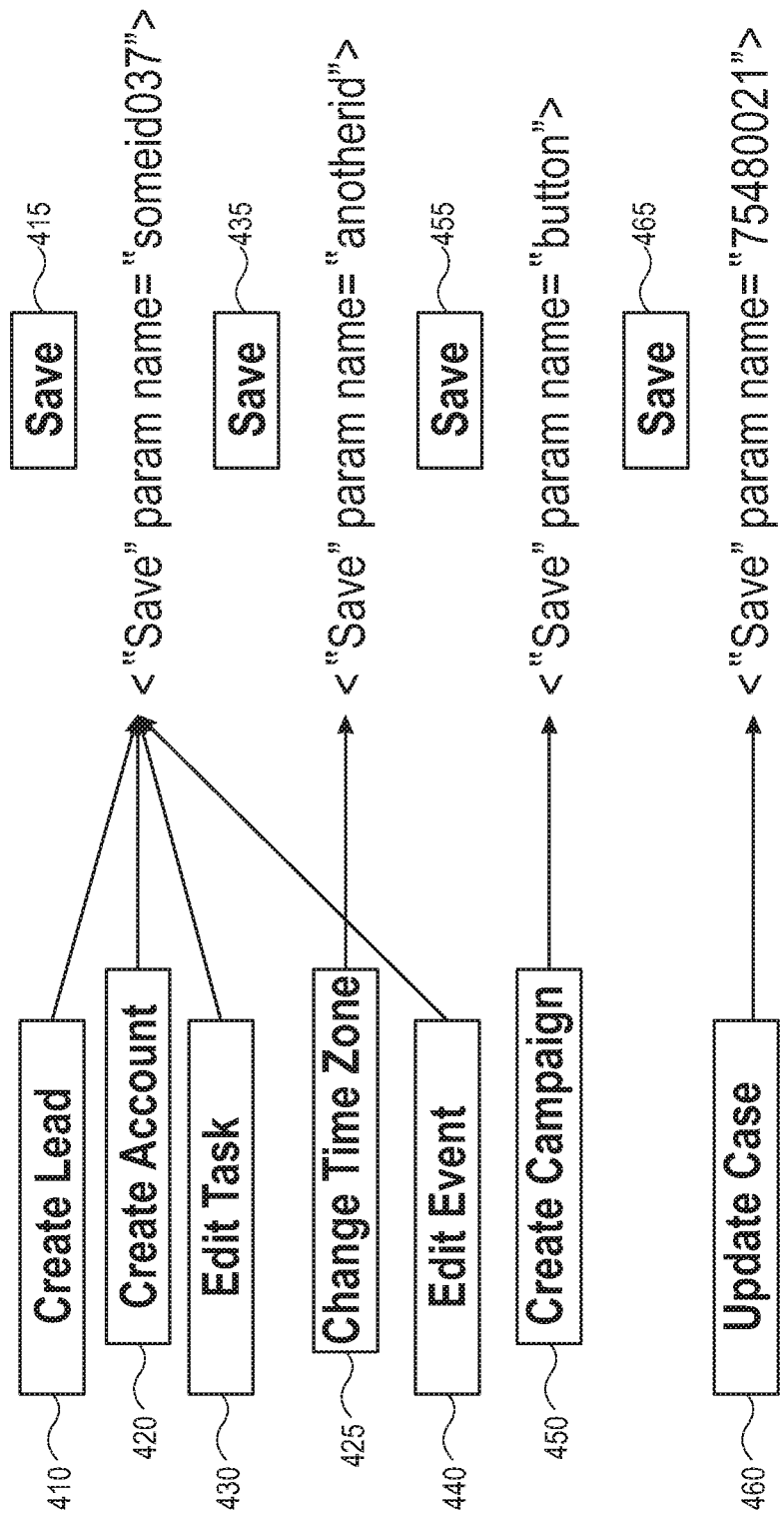
FIG. 4 is a diagram that illustrates UI components referencing text strings when the corresponding text string files are not included in a component file structure.

FIGS. 2-4 are diagrams that illustrate the shortcomings of an existing UI text string management scheme. More specifically, FIG. 2 is a diagram that illustrates how code for UI components can reference labels in the absence of an organizational principle that manages text strings, and FIG. 3 is a diagram that illustrates a methodology that utilizes UI text strings stored in a location (or different locations) that is referenced by the code of the corresponding UI components. Similarly, FIG. 4 is a diagram that illustrates UI components referencing text strings when the corresponding text string files are not included in a component file structure.

With reference to FIG. 2, the UI window 110 (also depicted in FIG. 1) can display any number of UI components having associated UI text strings and other content. In some implementations, each application feature of the UI environment has one or more component folders (e.g., one component folder for each UI component utilized by the application feature). Each application feature can have an extensive tree of folders, but each folder contains a similar set of file types (e.g., .cmp, .css, controller.js).

In the example of FIG. 2, folder structures are illustrated for only three UI components, although the actual number of folder structures for a given application feature may be less than or greater than three. For the illustrated implementation, sets of component folders are further grouped within the respective feature folders. Accordingly, FIG. 2 depicts a leads folder 270, which represents a folder at the application feature level. The leads folder 270 contains three component level folders, namely, a Component A folder 220, a Component B folder 230, and a Component C folder 240. This hierarchical folder structure indicates that the Leads feature utilizes at least three UI components (Component A, Component B, and Component C). The Leads example from a CRM environment is just one possibility; any type of application feature providing any type of functionality can be supported in a similar manner.

The Component A folder 220 includes files used in the generation and/or presentation of the UI component 120, which is a label for this particular example. Each UI component associated with the UI window 110 has a corresponding component folder. Thus, the Component B folder 230 stores the files for a UI component 210 (which represents another label in the UI window 110). Similarly, the Component C folder 240 stores the files for another UI component, namely, the button 140. A component folder may contain a variety of different file types as needed to support the UI environment. To this end, a .cmp file can have library content, security settings, user information, navigation information, customization information, and/or personalization information. As another example, a .css file can have style and display information for how content is to be displayed on a screen, paper, and other media. For the example depicted in FIG. 2, the component folders include .cmp, .evt, and .css files; however, different and/or additional file types can be supported. In accordance with the scheme depicted in FIGS. 2-4, the code for each UI component points to or otherwise references UI text files stored/located elsewhere.

FIG. 3 is a diagram that illustrates the UI window 110 with the referenced UI text strings in their respective UI components. In contrast to that shown in FIG. 2, the UI components are shown with their respective UI text strings: Create Lead, First Name, and Save. FIG. 3 also demonstrates how the UI text strings are stored in a location (or different locations) referenced by the code of the corresponding UI components. In the example of FIG. 3, code within each UI component folder 220, 230, 240 references the text strings used by the respective UI components, wherein the text strings are stored and maintained outside the feature folder (which is the leads folder 270 in this example), and outside the component folders 220, 230, 240.

Thus, the text string intended for use with the UI component 120—"Create Lead"—is stored in an appropriate file location 320 (such as a directory, folder, container, memory space, or file structure) outside of the leads folder 270. Nonetheless, the "Create Lead" text string can be referenced by the code of the appropriate UI component that is defined by the component folder 220. Similarly, the text string intended for use with the UI component 310—"First Name"—is stored in an appropriate external or remote file location 330 that is referenced by the code of the UI component defined by the component folder 230. Likewise, the text string intended for use with the button 140—"Save" is stored in an external/remote file location 340 that is referenced by the code that is associated with the button 140.

As shown in FIG. 3, the text string information stored at the file locations 320, 330, 340 include the words to be displayed in quotation marks, along with respective identifiers, which are used by the code of the UI components to indicate which text strings are to appear in the components.

FIG. 4 is a diagram that illustrates different UI components referencing UI text strings in accordance with a scheme where the corresponding text string files are maintained separately from the code of the UI components. For this particular example, each UI component (shown at the left side of FIG. 4) references the same literal text string, namely, the word "Save." Even though the same word is used by the different UI components, the text string referencing is inconsistent. More specifically, four UI components (the Create Lead component 410, the Create Account component 420, the Edit Task component 430, and the Edit Event component 440) individually reference the text string 415, only one UI component (the Change Time Zone component 425) references the text string 435, only one UI component (the Create Campaign component 450) references the text string 455, and only one UI component (the Update Case component 460) references the text string 465. The approach depicted in FIG. 4, which suffers from a lack of systematic information about where strings are referenced in the code or where they appear in the UI environment, can be problematic for the various reasons mentioned above. Indeed, in a large and complex software product or platform that includes many application features and many UI components, sorting out what text strings properly belong to what features and components can be an extremely difficult, challenging, and time consuming task.

The issues and problems outlined above (for a system that maintains UI text in a context-free manner) are addressed by an exemplary approach that facilitates the organization and maintenance of UI text strings that are used in complex software. For example, in various embodiments described herein, the problem of uniquely identifying each UI text string within software can be solved by storing each string within a suitably configured file structure, database element, or memory storage structure, together with a logical construct, such as a UI component, that defines or otherwise indicates the appearance and behavior of the interface element in which a string appears; with such structures in turn organized by the purpose filled by the software or a given part of the software. More specifically, the methodology described herein provides improved efficiencies through the inclusion of UI text strings in component-based file structures created and maintained for the software application of interest. As mentioned above in the context of certain embodiments, each text string is associated with other pieces of information, namely, the component in which the text string appears, along with the feature in which that component is used. The component specifies, identifies, or is otherwise associated with the visual and temporal context in which the string appears, and the feature specifies, identifies, or is otherwise associated with the conceptual context.

It should be appreciated that UI text can be organized and managed using any appropriate methodology, hierarchical arrangement of file/folder structures, or the like. The exemplary embodiment described here employs a top-down hierarchy (application feature>UI component>UI text) that is easy to understand and implement. In practice, however, a different hierarchy or a different organization scheme can be utilized to achieve the same benefits and results.

In accordance with certain embodiments, UI text strings are written into suitable files (e.g., extensible markup language (XML) files having the file extension ".xml") within existing UI component bundles for each application feature. In established systems, this file structure provides the additional benefit of bypassing the effort that would otherwise be needed to untangle the text strings in their current locations and identify the features and components that each text string is currently used in. In an embodiment, to eliminate duplication in the case of text strings used across a platform (such as the button label "Save"), a single UI text string can be used to reference across the code.

Figure 5:
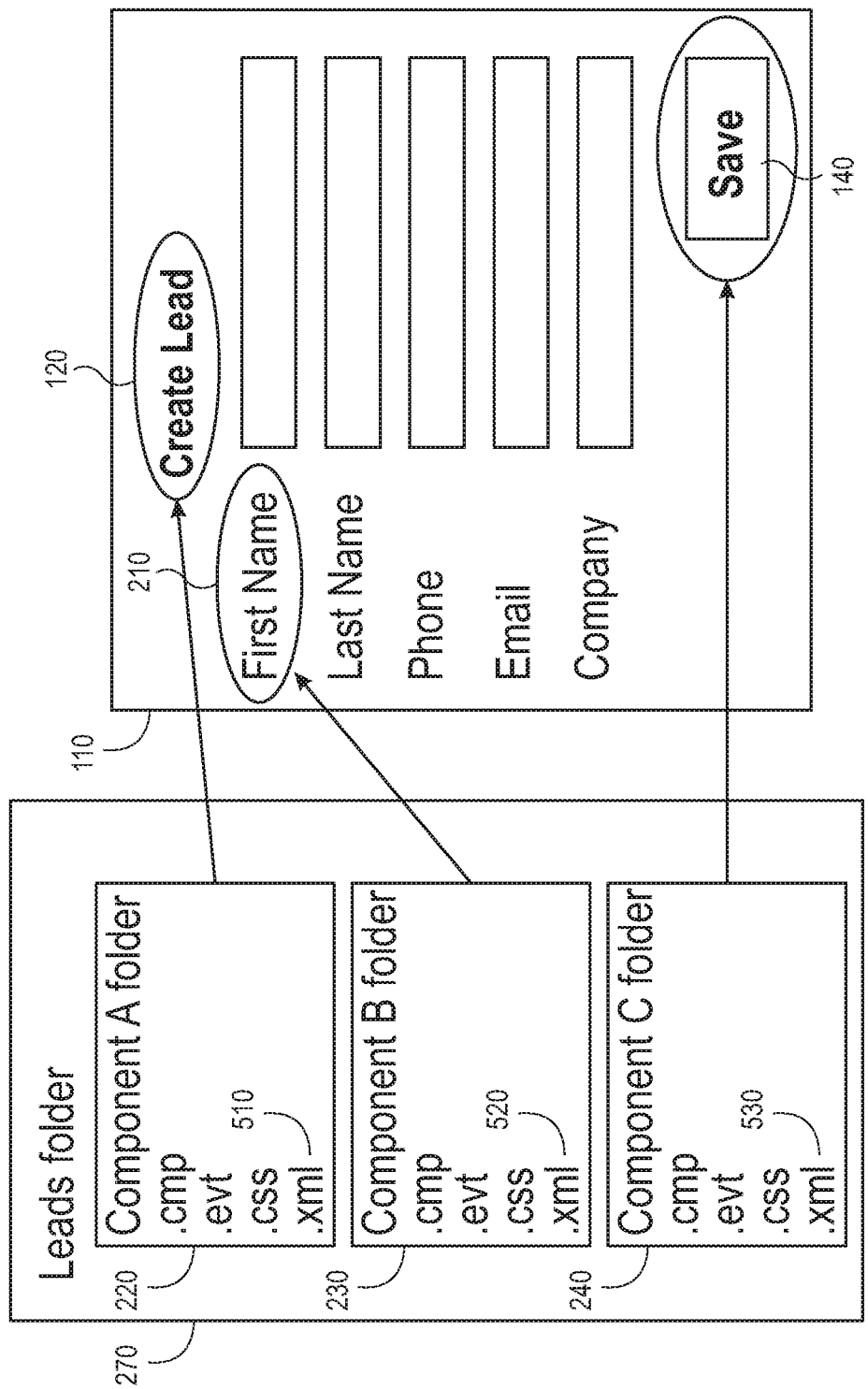
FIG. 5 is a diagram that illustrates an exemplary embodiment of a file structure that can be used to manage UI text strings, where the UI text strings are stored within the corresponding UI component file structure.
Figure 6A:
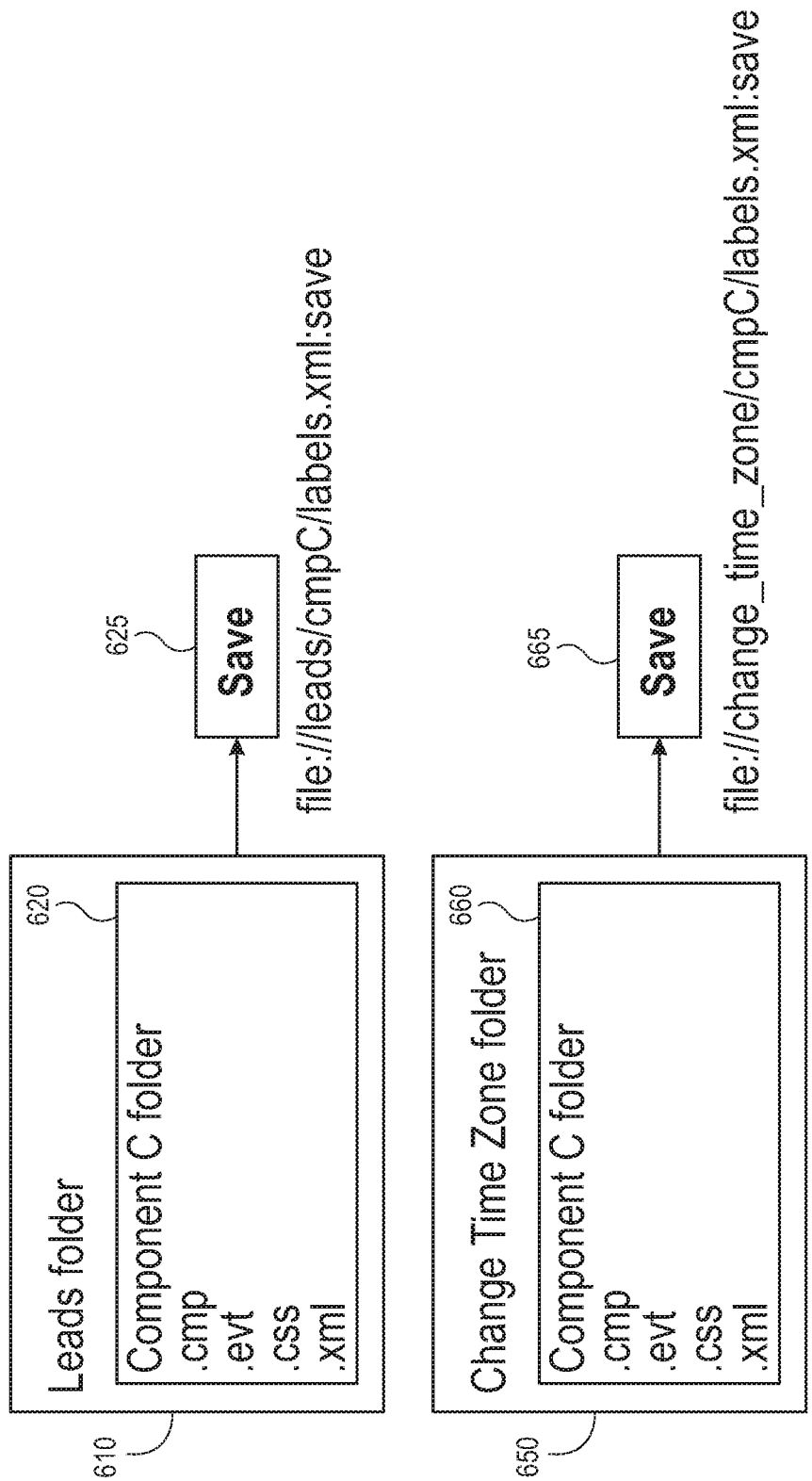
FIG. 6A is a diagram that illustrates an exemplary embodiment of a methodology that can be used to manage text strings.
Figure 6B:
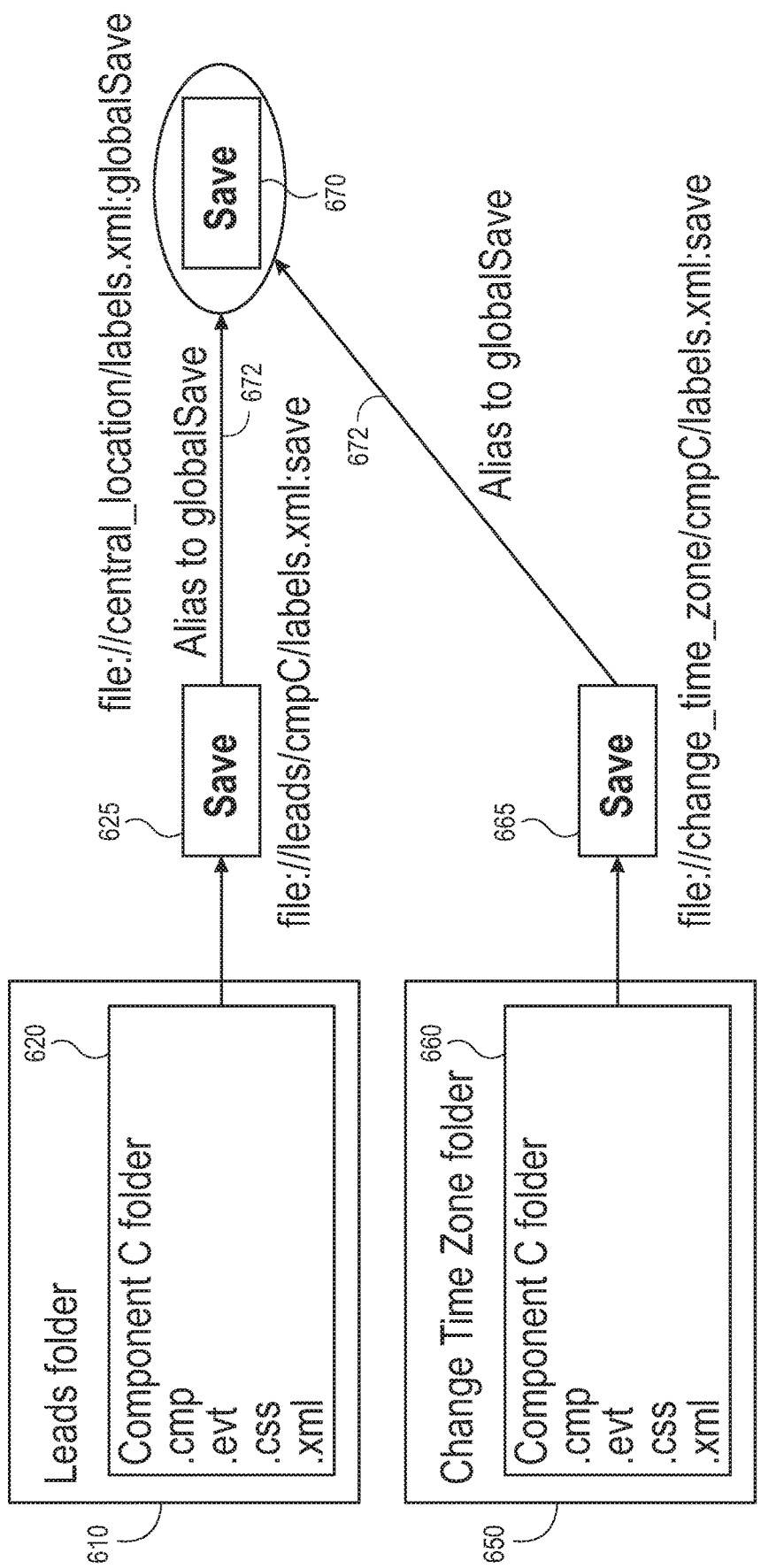
FIG. 6B is a diagram that illustrates an exemplary embodiment of a methodology that can be used to manage text strings, where the text strings can be referenced using an alias.

FIG. 5, FIG. 6A, and FIG. 6B are diagrams that illustrate an exemplary embodiment of a scheme that employs file structures to manage UI text strings for a software application. In this regard, FIG. 5 is a diagram that illustrates how the code for each UI component can include a text string file that contains the UI text strings for that particular UI component. In other words, the UI text strings are stored within a component file structure, which in turn may be located within the file or folder arrangement of the corresponding application feature. In the example of FIG. 5, each string is identified by its unique location in a single component within a single area of the component code.

In certain embodiments, the Component A folder 220 includes the component files discussed above as well as an XML file 510. In general, XML, files are widely used file formats that are used to share format and data utilizing graphical user interfaces. XML describes the content in terms of what data is being described. An XML file can be processed purely as data by a program, or it can be stored with similar data on another computer, or it can be displayed, like an HTML file. For example, depending on how the application in the receiving computer handles data that is marked as a phone number, the phone number can be stored, displayed, or dialed. Similarly, the Component B folder 230 includes an XML file 520, and the Component Colder 240 includes an XML file 530. While text string management is described herein with respect to an exemplary embodiment that uses XML files and structures, other file types and structures can also be used. For this implementation, the XML file 510 stores all of the UI text strings associated with the UI component 120. For example, one or more text strings (e.g., "Create Lead") that are used when the UI component 120 is displayed in the UI window 110 in a translation source language (such as English), along with approved translations that are used when the UI window 110 utilizes a different language (such as Portuguese). Notably, storing and maintaining an XML file within a hierarchical folder structure automatically establishes the desired contextual associations between the UI text strings contained in the XML file, the corresponding UI component, and the corresponding application feature.

FIG. 6A is a diagram that illustrates a methodology that utilizes UI text strings stored with the code/files of their respective UI components. In certain embodiments, identical strings (such as the word "Save") can have unique identifiers that indicate the contextual usage of the strings within the domain of the UI environment. More specifically, the Leads folder 610 can include any number of UI components defined by different component folders, such as a Component C folder 620 that contains the component files discussed above. Similarly, a Change Time Zone folder 650 can include any number of UI components defined by component folders, such as a Component C folder 660, which can include the component files as discussed above. The Component C folder 620 (which resides in the Leads folder 610) contains an XML file that includes an instantiation of the Save text string 625 to be utilized in the context of Component C of the Leads application feature. In FIG.

6A, the file path of the Save text string 625 distinguishes it from any other text string in the hierarchy. Similarly, the Component C folder 660 (which resides in the Change Time Zone folder 650) contains an XML file that includes an instantiation of the Save text string 665 to be utilized in the context of Component C of the Change Time Zone application feature. In FIG. 6A, the combined file path and ID of the Save text string 665 distinguishes it from any other text string in the hierarchy. The different file paths demonstrate how different instantiations of the same word, which is used for the same function (saving an object to memory), can be distinguished by maintaining the text string files in a component-based file/folder structure. Each text string's unique context is inherent in the string's location in the file/folder hierarchy. Instead of being referenced in the code by its location in a separate database or file structure, which may provide no inherent context, a string is referenced in the code by its location in a component-based hierarchy. In a component-based system, a string's location is always unique, is always current, and always provides context about the string's appearance, behavior, purpose, and/or other characteristics in the software interface.

Because each text string is uniquely identifiable by its location, a change to the content of any individual string affects only that string and no other. For example, suppose that it is desirable to change the button label in the Change Time Zone feature from "Save" to "Switch." In the XML file in the Component C folder 660, the developer changes the content of string 665 from "Save" to "Switch." By definition, "Switch" appears only in the UI generated by the code in the Change Time Zone folder 650, and not in the Save text string 625 or any other part of the UI. This approach represents a practical solution to the problem outlined above (where substitution of "Submit" to "Save" works well for a feature that actually saves a record to storage, but is undesirable for a feature that sends an outgoing email).

FIG. 6B is a diagram that illustrates an extension of the methodology described above. As explained previously, the two instantiations of the Save text string 625, 665 are stored in their respective locations with corresponding unique identifiers that distinguish them from one another (that from other instances of the same UI text string). In certain scenarios, identical text strings having similar or identical contextual usage within the UI environment can be referenced using a common alias, a file pointer, a shortcut, or the like. For this particular example, assume that the Save text string 625 is contextually and functionally identical to the Save text string 665 in that both are used on a clickable button to initiate an object saving operation. In such situations, an alias can be used to reference a single text string. For this example, one or more of the files within the Component C folder 620 reference the text string "Save" 670 via an alias 672. Similarly, one or more of the files within the Component C folder 650 also reference the same text string "Save" 670 via the alias 672. The use of aliases in this manner can reduce the use of redundant text strings (such as the text strings 435, 455, 465 depicted in FIG. 4), which can make text string maintenance more efficient and improve the performance of the system.

A system utilizing the component structures described herein, i.e., a system in which each UI text string is uniquely identifiable by its context, can provide benefits across software (e.g., at Salesforce, across the entire platform, across a partner app, or including acquired products and features). Such a system provides context needed to write accurate and appropriate text for each string and to manage UI text effectively across the software. Using such a system, a writer or developer can change any UI text string in the application with confidence that he is not inadvertently changing other UI text strings.

As another benefit, a system utilizing the component structures described herein can improve productivity and reduce the costs of updating and maintaining UI text across a platform. UI text strings organized according to such a system can be pulled into a repository (e.g., a content management system, or CMS). Writers responsible for the content of the strings can use such a repository to access and update strings without handling the code or involving developers, quality engineers, or product managers. A repository organized in this way can facilitate accurate and timely insertion and removal of strings, for example labels indicating release status such as beta or pilot. A repository organized in this way also makes it much more feasible and cost effective for writers to attach code comments containing additional information for translators, making localization more efficient and accurate.

As another benefit, a system utilizing the component structures described herein can be used to improve quality, usability, and consistency. For example, a repository of UI text strings with unique identifiers can be accessed by a software component or module to check, confirm, or search for certain characteristics associated with the various UI text strings. Such a system makes it feasible and cost-effective to check all UI text for errors and ensure consistency (e.g., by running software for analyzing or optimizing content, such as the ACROLINX software product) and to quickly correct problems, for example before source content is delivered to translators, again without involving developers, quality engineers, or product managers. In turn, such a system makes localization more efficient and effective by improving the source content that translators work from. These improvements can be made to source content in any language. As another example, the system can be used to identify all content in similar components and repeat desirable patterns of voice and tone. For example, if an error occurs after a user edits data, software can display a variety of messages, and when messages with similar meanings are worded in different ways in each feature, software is harder to use. The system described herein makes it feasible and cost-effective to identify messages with similar meanings and update messages for consistency.

As another benefit, a system utilizing the component structures described herein can be used to improve performance by facilitating the identification of redundant strings with identical wording (e.g., "Save"), which can then be replaced with references to a single label (as shown in FIG. 6B). Such changes can also optimize performance by minimizing the number of UI text strings. Such changes can also reduce localization costs by improving the source content that translators work from and reducing the number of different phrases to be translated.

As another benefit, a system utilizing the component structures described herein can also be used to facilitate the integration of products and features added through the acquisition of companies, for example when those products and features are built using similar components.

Figure 7:
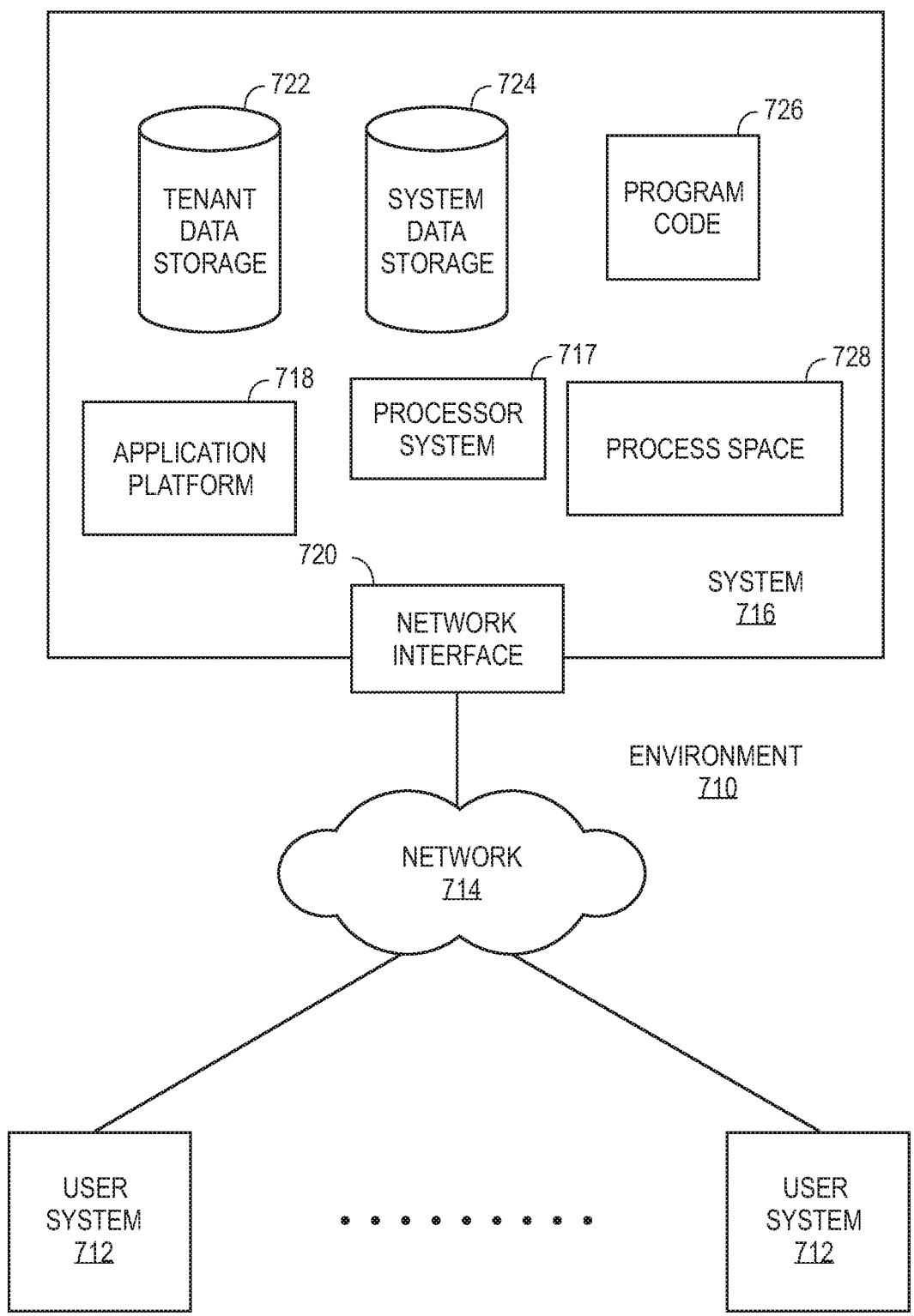
FIG. 7 is a block diagram representation of an exemplary environment in which an on-demand database service might be used.

The approaches and methodologies presented here can be utilized in various computer-based environments, network environments, and/or database system environments. In this regard, FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 need not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8), user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Core series processor or the like. Similarly, system 716 (and additional instances of an MTS, where more than one is present) and all of their components might be operator configurable using application(s) including computer code to run using a central processing unit such as processor system 717, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 8:
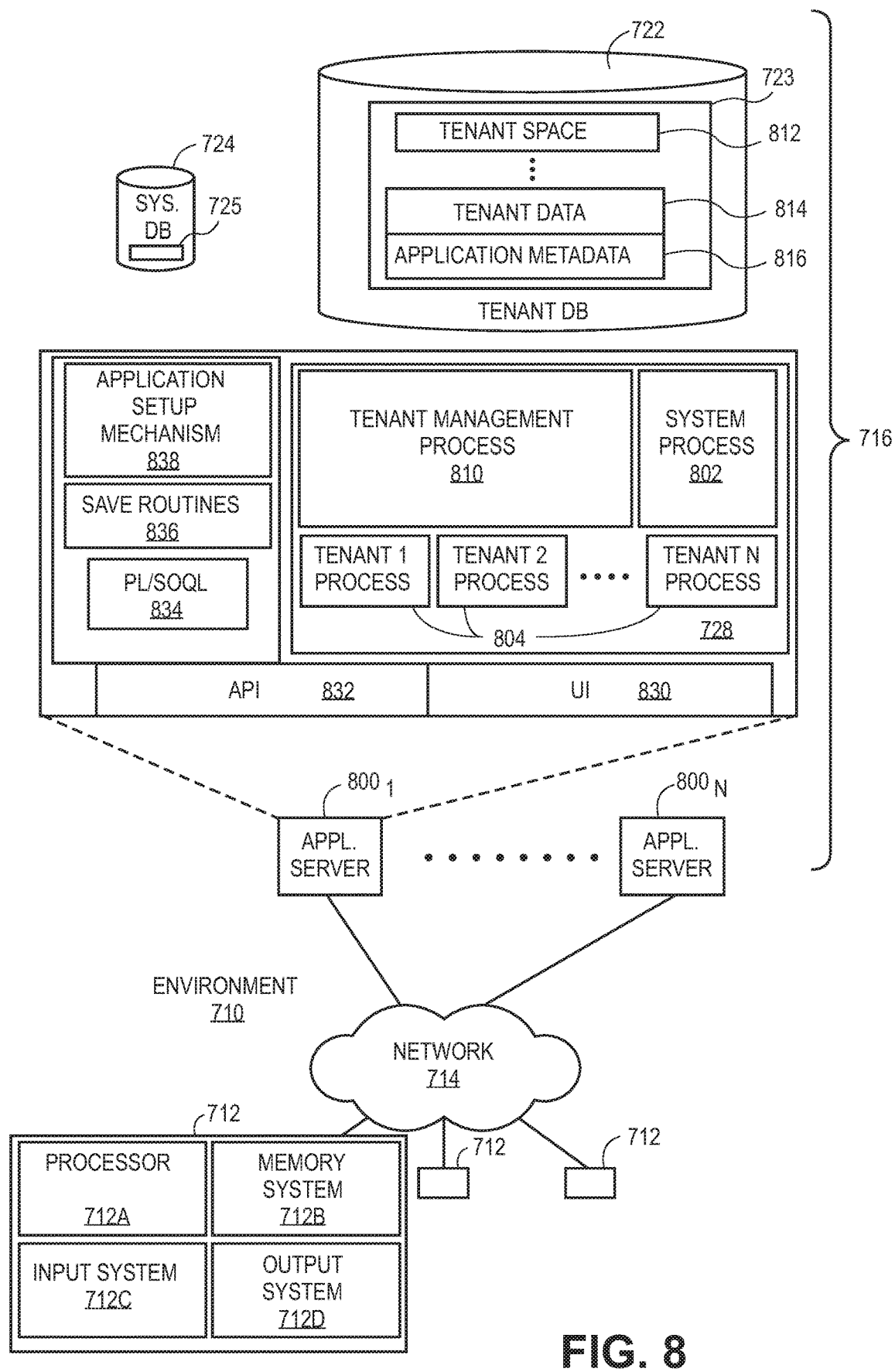
FIG. 8 is a block diagram representation of another exemplary environment in which an on-demand database service might be used.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 8001-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above with reference to FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown in FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800₁ might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 BIG-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing text strings for a graphical user interface, the method comprising:
defining a hierarchical folder structure for a user interface (UI) environment of an application comprising: a plurality of application features each having a corresponding UI window for that application feature that comprises one or more UI components each having at least one corresponding UI text string associated with that UI component, wherein the hierarchical folder structure comprises: an application level feature folder for each application feature that defines that application feature and that comprises a respective component folder within the application level feature folder for each of the one or more UI components utilized by that application feature;
for each respective UI component having a UI text string associated with that respective UI component: maintaining a text string file within the respective component folder for that respective UI component, wherein at least one of a visual, a temporal and an interactive context of the UI text string in association with the respective UI component of a respective application feature in the application is uniquely identifiable by a location of that text string file within the respective component folder in the hierarchical folder structure, the at least one of the visual, the temporal and the interactive context comprising at least one of an appearance, a behavior and purpose of the UI text string; and
executing the application to generate UI windows of the UI environment using computer readable files found in the respective component folders, wherein the text string file defines the UI text string to be displayed for a respective UI component.

2. The method of claim 1, wherein each application level feature folder is maintained in the memory.

3. The method of claim 2, wherein each UI component is defined by computer readable component files that are used to generate that UI component.

4. The method of claim 3, wherein each of the computer readable component files for a particular UI component are organized in a respective component folder.

5. The method of claim 4, wherein the respective component folders for the particular UI components are maintained in the memory within a particular application feature folder.

6. The method of claim 1, further comprising:
using the text string files to indicate the UI text strings to be provided with the UI components defined by the computer readable files.

7. The method of claim 1, wherein at least some of the UI components are used in multiple contexts within the UI environment, and with identical UI text strings for each of the multiple contexts.

8. The method of claim 1, wherein the UI text strings comprise labels for the UI components.

9. The method of claim 1, further comprising:
creating the hierarchical folder structure for the UI environment, the hierarchical folder structure arranged to provide associations between UI text strings, UI components, and corresponding application features of the UI environment, and wherein each UI text string is uniquely identifiable by its unique location in a single component folder of the hierarchical folder structure such that a change to content of that UI text string affects only that UI text string and no other UI text string.

10. The method of claim 9, wherein the hierarchical folder structure is accessible to a software component to check characteristics of the UI text strings.

11. The method of claim 1, wherein the text string file for at least one respective UI component comprises an alias that references the UI text string for that respective UI component.

12. The method of claim 11, wherein the alias comprises a file pointer or a shortcut.

13. The method of claim 11, wherein the alias comprises a single text string for a plurality of UI components having similar contextual usage.

14. The method of claim 13, wherein the similar contextual usage comprises contextually and functionally identical UI components to initiate a common operation.

15. The method of claim 1, wherein:
the respective application feature comprises a functionality of the application; and
the interactive context comprises an operation associated with the functionality of the application.

16. The method of claim 1, wherein the text string file comprises an extensible markup language (XML) file.

17. A system comprising:
memory comprising one or more storage structures configurable to store:
an application comprising a plurality of application features, wherein each application feature has a corresponding user interface (UI) window for that application feature, wherein each UI window comprises at least one UI component, each UI component having one or more corresponding UI text strings associated therewith; and
one or more processors coupled with the memory device, the one or more processors configurable to:
define a hierarchical folder structure for a user interface (UI) environment of the application comprising: the plurality of application features, each of the application features having a corresponding UI window for that application feature that comprises one or more UI components each having at least one corresponding UI text string associated with that UI component, wherein the hierarchical folder structure comprises: an application level feature folder for each application feature that defines that application feature and that comprises a respective component folder within the application level feature folder for each of the one or more UI components utilized by that application feature;
for each respective UI component having a corresponding UI text string associated with that respective UI component: maintaining a text string file within the respective component folder for that respective UI component, wherein at least one of a visual, a temporal and an interactive context of the UI text string in association with the respective UI component of a respective application feature in the application is uniquely identifiable by a location of that text string file within the respective component folder in the hierarchical folder structure, the at least one of the visual, the temporal and the interactive context comprising at least one of an appearance, a behavior and purpose of the UI text string; and
execute the application to generate UI windows of the UI environment using computer readable files found in the respective component folders, wherein the text string file defines the UI text string to be displayed for a respective UI component.

18. The system of claim 17, wherein at least some of the UI components are used in multiple contexts within the UI environment, and with identical UI text strings for each of the multiple contexts.

19. The system of claim 17, wherein the hierarchical folder structure for the UI environment is arranged in the memory to provide associations between UI text strings, UI components, and corresponding application features of the UI environment, wherein the hierarchical folder structure is accessible to a software component to check characteristics of the UI text strings, and wherein each UI text string is uniquely identifiable by its unique location in a single component folder of the hierarchical folder structure such that a change to content of that UI text string affects only that UI text string and no other UI text string.

20. A computer-implemented database system comprising a memory and one or more processors coupled with the memory, the one or more processors configurable to create and maintain a hierarchical folder structure for a user interface (UI) environment of an application comprising a plurality of application features each having a corresponding UI window for that application feature that comprises one or more UI components each having at least one corresponding UI text string associated with that UI component, wherein each UI text string is uniquely identifiable by a location of that UI text string in the hierarchical folder structure, the hierarchical folder structure comprising:
for each application feature:
an application level feature folder maintained in the memory, wherein the application level feature folder defines an application feature supported by the UI environment, the application feature comprising a UI component associated therewith, the UI component comprising a UI text string associated therewith, wherein each UI text string is uniquely identifiable by its unique location in a single component folder of a component-based folder hierarchy such that a change to content of that UI text string affects only that UI text string and no other UI text string, wherein each application level feature folder comprises:
a component folder for each UI component utilized by that application feature, each component folder being located in the application level feature folder, wherein each component folder comprises:
computer readable files used to generate that UI component; and
a text string file located in that component folder, wherein the text string file defines content of the UI text strings displayed for that UI component and at least one of a visual, a temporal and an interactive context of the UI text string in association with the respective UI component of a respective application feature in the application is uniquely identifiable by the location of that text string file within the respective component folder in the hierarchical folder structure, the at least one of the visual, the temporal and the interactive context comprising at least one of an appearance, a behavior and purpose of the UI text string.

* * * * *